March 25, 1952     J. P. RUTH     2,590,578
SUGAR DIFFUSING APPARATUS
Filed March 4, 1950     2 SHEETS—SHEET 1
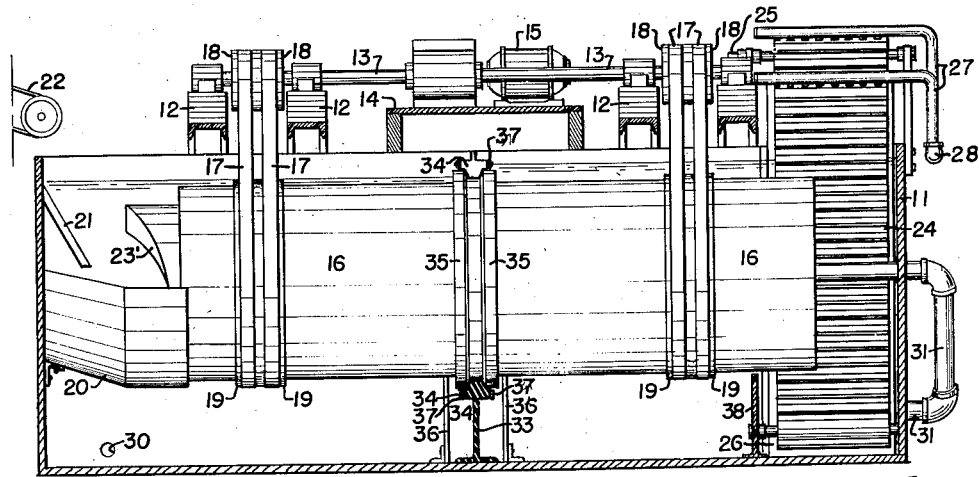
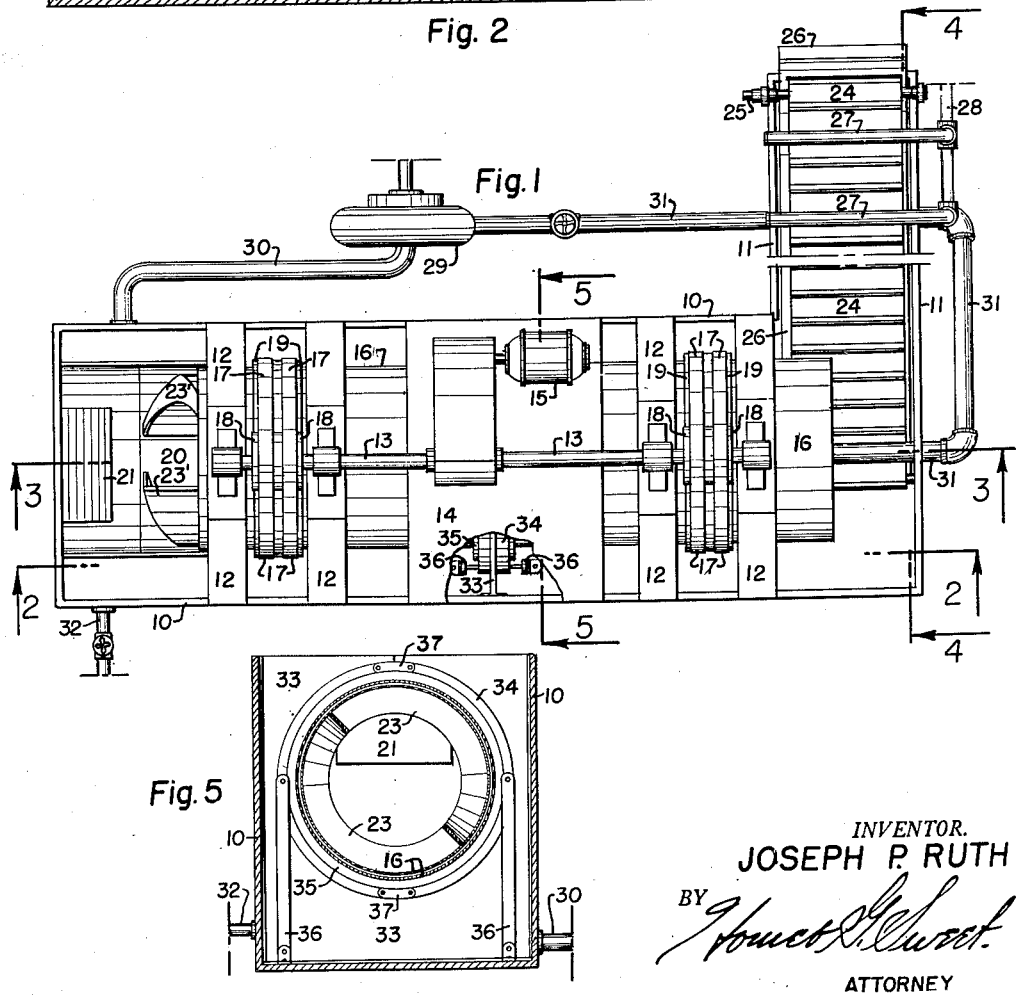
INVENTOR.
JOSEPH P. RUTH
BY
ATTORNEY Patented Mar. 25, 1952

2,590,578

UNITED STATES PATENT OFFICE 2,590,578

SUGAR DIFFUSING APPARATUS

Joseph P. Ruth, Denver, Colo.

Application March 4, 1950, Serial No. 147,676

11 Claims. (Cl. 127—7)

This invention relates to the art and practice of manufacturing sugar from sugar beets, and more particularly to that step in such manufacture as is directed to the extraction of sugar content from the beet material, and has as an object to provide novel and improved means efficiently operable to effect diffusion of the sugar content from beet material by means of a water medium.

A further object of the invention is to provide improved means and apparatus operable in replacement for conventional diffusion cells and batteries to effect continuous water extraction of sugar content from beet material.

A further object of the invention is to provide improved apparatus for the continuous diffusion of sugar from beet material in a single unit adapted for the separate removal of extracted sugar and vitiated beet pulp without interruption of apparatus operation.

A further object of the improvement is to provide an improved diffusing unit for the extraction of sugar from beet material and adapted for continuous, uninterrupted operation in correlation with a continuing supply of beet material.

A further object of the invention is to provide an improved diffusing unit for the extraction of sugar from beet material that is susceptible of operative adjustment and regulation to perfect a high extractive efficiency in uninterrupted operation.

A further object of the invention is to provide an improved diffusing unit for the extraction of sugar from beet material that is characterized by novel and improved means for regulating and adjusting the uninterrupted transit of beet material therethrough.

A further object of the invention is to provide an improved diffusing unit for the extraction of sugar from beet material that is characterized by novel and improved means for effectively applying recirculation techniques in the uninterrupted treatment of beet material under translation therethrough.

Figure 4:
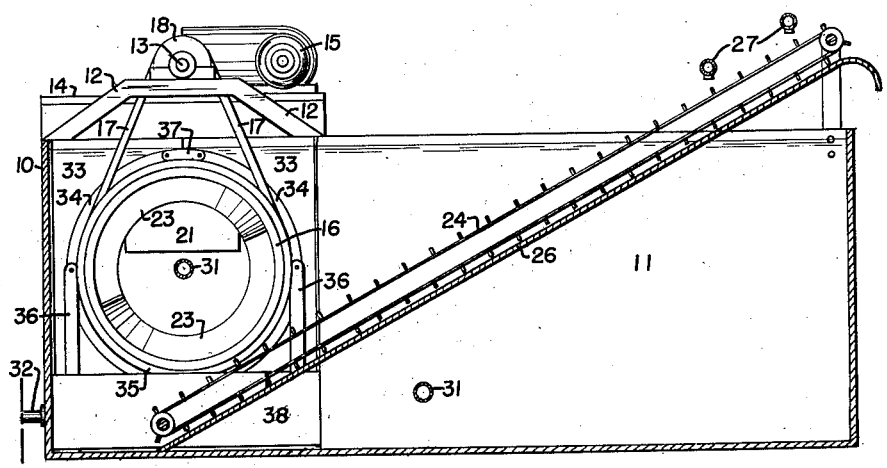
Figure 3:
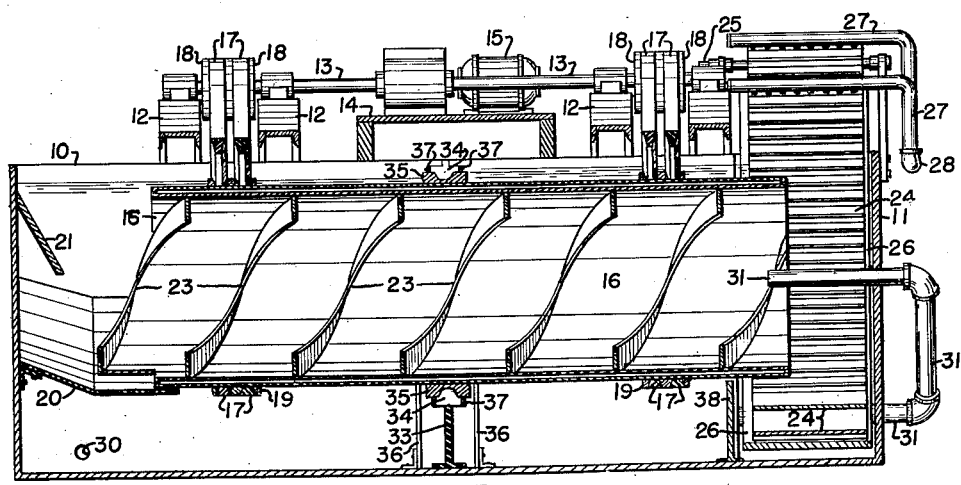
Figure 6:
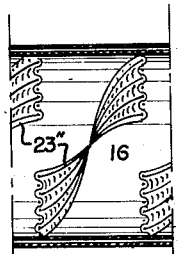

With the foregoing and other objects in view, my invention consists in the construction, arrangement, and combination of elements hereinafter described, pointed out in my claims, and illustrated by the accompanying drawings, in which:

Figure 1 is a plan view of a typical embodiment of the invention as constructed and assembled ready for practical use, certain elements of the showing being broken away to disclose otherwise concealed associations and to conserve space. Figure 2 is a section on a vertical plane taken substantially on the indicated line 2—2 of Figure 1. Figure 3 is a section on a vertical plane taken substantially on the indicated line 3—3 of Figure 1. Figure 4 is a section on a vertical plane taken substantially on the indicated line 4—4 of Figure 1. Figure 5 is a transverse section taken substantially on the indicated line 5—5 of Figure 1. Figure 6 is a fragmentary, detail section through modified means alternatively employable in and with the invention.

In the manufacture of sugar from sugar beets, an early stage of the appropriate processing is characterized by cutting and slicing of the raw beet material into chips or fragments known as cossettes and immediately subsequent leaching of such cossettes in water, usually at elevated temperature, to diffusion of the beet material sugar content through the plant cell walls and into solution within the leaching bath whence it is later recovered. The means and apparatus conventionally employed for the leaching of sugar beet cossettes is somewhat less than desirably efficient in various respects, including inadaptability to fully automatic, truly continuous operation, and the instant invention is hence directed to the provision of improved means automatically and continuously operable to efficiently extract the sugar content from sugar beet cossettes fed thereinto.

In the construction of the improvement as shown, an open-top tank of desired size and any particular construction appropriate to contain liquid is formed to provide a greater, generally rectangular portion 10 and an associated lesser, generally rectangular portion 11 in communication with and extending laterally from one end of the portion 10 substantially perpendicular thereto. The tank portions 10 and 11 are conveniently of like depths adequate for accommodation of the elements and relationships hereinafter recited and combine to constitute a single, L-shaped tank adapted for free circulation of liquid contents in and between its angularly-related portions. Beams 12 fixedly bridge in suitably-spaced, parallel relation transversely of and above the tank portion 10 open top to mount and rotatably support a shaft 13 with its axis horizontal and in the vertical plane longitudinally bisecting said tank portion, and a platform 14 bridging the tank portion 10 open top beneath a central portion of said shaft mounts a motor 15 in driving relation with and for power rotation of the said shaft 13.

A straight, tubular drum 16, preferably of hollow wall construction for enhanced buoyancy, is provided in a size freely receivable within the tank portion 10 and is therein rotatably suspended with its axis spacedly paralleling that of the shaft 13, one of its open ends spacedly adjacent the tank portion end remote from the lesser tank portion 11, and the other of its open ends within the zone of intercommunication between the tank portions 10 and 11, by means of V-belts 17 engaging, preferably in multiple, about lesser grooved pulleys 18 fixed to and adjacent the ends of the shaft 13 and coplanar, greater grooved pulleys 19 fixed exteriorly about and adjacent the ends of the drum 16. In appropriate, uniform length, the belts 17 support the drum 16 within the tank portion 10 and wholly beneath the liquid level normal to said tank, the buoyant effect of the drum hollow wall construction minimizing the load applied to said belts, and also serve to transmit rotation of the shaft 13 to and for simultaneous rotation of the drum 16 about its axis at a speed reduced relative to that of the shaft. The end of the drum 16 remote from the tank portion 11 overhangs a transversely-arcuate saddle 20 fixedly closing at an upward inclination against the adjacent tank portion 10 end wall, and a baffle 21 fixed to and inclining outwardly and downwardly from said tank portion end wall spacedly overhangs said saddle to direct cossette delivery from a conveyor 22 end above the tank end toward and for reception within the adjacent drum open end. The drum 16 is furnished with spiral conveyor flights 23 fixed to and extending radially inwardly from the cylindrical, interior drum wall in a pitch of uniformly-spaced convolutions effective to translate material through the drum from the tank end furnished with the saddle 20 and to delivery within the zone of tank portion 10 and 11 junction as an incident of drum rotation deriving from power drive of the shaft 13, said flights outstanding from the drum inner wall a distance less than would preclude free passage longitudinally of the drum, and ends of the flights adjacent the saddle 20 and baffle 21 are extended exteriorly of the drum in cooperation with segmental axial extensions of the drum inner wall to constitute scoops 23' operable as an incident of drum rotation to charge the flight 23 convolutions, and the drum 16, with cossettes accumulated upon the saddle 20, thereby providing for continuous charging of the drum 16 with material delivered by the conveyor 22 and for continuous translation of such charge, under moderate agitation, through said drum and the liquid wherein it is immersed.

Substantially filling the width of the tank portion 11 and in upward and outward inclination longitudinally thereof from a lower end underlying the discharge end of the drum 16 to an upper end overhanging the tank portion end remote from said drum, a conveyor 24, conveniently of transversely-slatted, endless belt type, is mounted for travel between terminal rollers in a usual manner and is adapted to be independently power driven, as through connections 25, for upward and outward travel of its upper run effective to elevate and translate cossette material discharged from the drum 16 out of the tank liquid charge and to delivery away from the tank across the tank portion 11 closed end. A fixed, rigid apron 26 preferably closely underlies the conveyor 24 at a conforming inclination to return drippings, washings, losses, and adhered fragments of the conveyor charge to the zone of tank portion 10 and 11 junction, the upper outer end of said apron being outwardly and downwardly curved to facilitate gravity translation of conveyor delivery, and spray arms 27, similarly served with water under pressure from a main 28, spacedly and transversely overhang the conveyor 24 travel path above the tank liquid level for impingement of their spray discharge with washing effect upon the outgoing conveyor charge of cossette material and consequent addition of such washings to the tank charge.

Circulation and recirculation of the tank liquid charge through the drum 16 for leaching effect upon the cossette material under agitation within and translation through said drum and for development of a current opposed to and moderately retarding the translation of cossette material through the drum is established and maintained by means of an independently power driven pump 29, of any appropriate design, capacity, and construction, whereof the intake is served by a line 30 connecting with the tank portion 10 near the tank floor and the tank end furnished with the saddle 20 and the outlet delivers through a valved line 31, conveniently traversing the tank portion 11 beneath the apron 26, axially of and just within the discharge end of the drum 16 and toward the drum intake end, so that, with the pump 29 operating, liquid withdrawn from the tank adjacent the drum intake end is delivered interiorly of the drum discharge end for flow through said drum in a direction counter to that of cossette material travel at a rate and pressure susceptible of regulation through control of pump 29 operating speed and adjustment of the valve in the line 31. Circulation and recirculation of the tank liquid charge in the manner and by the means just above described effectively exposes cossette material within in the drum 16 to efficient leaching and diffusion of the sugar content therefrom, develops and maintains uniformity of sugar concentration in the tank liquid, concentrates any preponderance of sugar concentration in the liquid at the tank end whence liquid withdrawal may be had as hereinafter described, and modifies the rate of cossette translation through the drum 16 to prolonged retention thereof in a position and condition conducive to thorough extraction of the sugar content. A valved outflow line 32 serving the end of the tank portion 10 furnished with the saddle 20 and preferably communicating with said tank interior adjacent the tank floor and through the tank side opposite to that engaged by the line 30 provides means for selective withdrawal of sugar-charged liquid from the tank and conduct thereof to subsequent processing stages and apparatus with consequent control of the liquid level within the tank.

Productive of a differential between the liquid heads at the opposite ends of the drum 16 effective to supplement and positively maintain the circulation of tank liquid through the drum initiated by line 31 discharge, a partition 33 transversely divides the tank portion 10 at approximately the midlength of the drum in rotatable accommodation of the latter. For operative correlation with the suspension mounting of the drum 16, the partition 33 is preferably constituted from a web or sheet of impervious, resilient material, such as rubber, or the like, mounted and fixed within the tank 10 portion to close against the tank floor and side walls and to rise in embracing relation with the drum midlength to an upper margin well above said drum and conveniently in the tank top plane, the resiliently-deformable nature of the partition accommodating minor deviations of the drum relative to the tank during operation of the apparatus. The partition 33 is appropriately apertured to fit exteriorly about the drum 16 and may be divided above the drum to facilitate apparatus assembly, maintenance and repair, and to minimize leakage of tank liquid through the joint between the drum and partition the margin of the drum-accommodating partition aperture may be formed as a relatively heavy, annular rib 34, wedge-shaped in cross section, conformably engageable with and to fill the space between rings 35 fixed exteriorly about and definitive of a V-shaped channel around the drum, thus establishing a rotation-accommodating seal of adequate effectiveness. Since the partition annular rib 34 tends to rotate with the drum 16, it is expedient to provide rigid links 36 hingedly upstanding from the tank floor adjacent the partition 33 and on opposite sides of the drum and to operatively connect upper ends of said links with diametrically opposite points on the rib 34, whereby said links are disposed substantially tangent to the orbit of drum rotation and positioned to effectively resist the torque tending to rotate the rib. Corresponding side margin portions of the rib 34 on opposite sides of the partition and rib division provided for facility of assembly may be interlinked by means of clips 37 detachable to permit opening of the partition for separation of its rib from sealing engagement about the drum 16, when desired.

A baffle 38 fixedly upstanding from the tank floor beneath the drum 16 discharge end and laterally traversing the tank portion 10 adjacent its junction with the tank portion 11 is provided to confine the cossette discharge from said drum to the region of the tank served by the conveyor 24.

With the partition 33 in place in operative association with the rotating drum 16 and the pump 29 operating, correlation of the selectively-regulable features of the apparatus may readily be had to establish and maintain a level of tank liquid in the tank portions 10 and 11 at that side of the partition 33 occupied by the drum discharge end higher than the level within the tank portion 10 at the side of the partition occupied by the drum intake end, so that the thus-established liquid head differential conduces to a current or flow of liquid through the drum 16 and from the discharge to the intake end thereof effective to oppose cossette material translation through the drum induced by the spiral flights 23, particularly as such material falls through the open drum central passage, and hence operable to expose said material to diffusing and leaching action of the circulating liquid for a prolonged period.

The tank liquid may be heated and maintained at elevated temperature suited to sugar-extracting operation of the apparatus in any expedient manner and through conventional means associated with or exterior to the apparatus shown and described; such heating of tank-confined liquids being well-known conventional practice.

As represented by Figure 6 the spiral flights 23 may be constituted from reticulate or foraminous material readily pervious to the passage of liquid, instead of from solid material wherethrough liquid may not pass; the flights of pervious material functioning to agitate and translate cossette material in exactly the same manner as is characteristic of the non-pervious flights.

The principles of sugar extraction from beet material by means of diffusion being generally understood and the operative principles and relationships of the improved apparatus being clearly readable from the drawings and foregoing description, it is believed that the operative variations and adaptations of the improvement incident to particular functional applications thereof are inherent in the disclosure without further elaboration.

Since many changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A diffusing apparatus, comprising a tank, means for simultaneously agitating and translating material with leaching effect within a liquid body confined by said tank, means including a partition transversely dividing the liquid body exteriorly of said first means for circulating the liquid body to cause generation therein of a flow current through said first means opposed to translatory travel of material therethrough, means for continuously feeding material to the initial end of its translatory path through the liquid body, means for continuously removing material from the liquid body at the terminal end of its translatory path, and means for selectively withdrawing liquid from the body adjacent the infeed of material thereto.

2. Apparatus according to claim 1, wherein the means for simultaneously agitating and translating material to be leached within said body comprises an open-ended, tubular drum power-rotatable about its horizontally-disposed axis in complete submergence within the liquid body through and in sealing cooperation with said partition and continuously-spiral rib flights on and projecting inwardly from the drum inner cylindrical wall.

3. Apparatus according to claim 1, wherein the liquid body is tank-confined about and in submerging relation with an open-ended, tubular drum power-rotatable about its horizontally-disposed axis for translation of material longitudinally therethrough as an incident of its rotation, and the means for generating a liquid flow current counter to the path of material travel through said drum comprises a pump-served bypass operable to deliver liquid from adjacent the infeed end of said drum to discharge axially of the drum output end directed toward the drum infeed end, and a partition transversely dividing the liquid body in rotation-accommodating cooperation with a drum midportion to inhibit level-adjusting liquid body displacement save through said drum.

4. Apparatus according to claim 1, wherein the liquid body is tank-confined about and in submerging relation with an open-ended, tubular drum power-rotatable about its horizontally-disposed axis through and in sealing cooperation with said partition for translation of material longitudinally therethrough as an incident of its rotation, and the means for continuously feeding material to the initial end of its translatory path through the liquid body comprises a material conveyor arranged for delivery to the liquid body exteriorly adjacent the drum infeed end, a fixed baffle inclining toward the drum infeed end in the path of delivery from said conveyor, a fixed saddle inclining toward and arcuately cooperating with the lower arc of the drum infeed end, and spiral scoops on and fixedly projecting axially from the drum infeed end for transfer of material from said saddle and to the drum interior as an incident of drum rotation.

5. Apparatus according to claim 1, wherein the liquid body is tank-confined about and in submerging relation with an open-ended, tubular drum power-rotatable about its horizontally-disposed axis through and in sealing cooperation with said partition for translation of material longitudinally therethrough as an incident of its rotation, and the means for continuously removing material from the liquid body at the terminal end of its translatory path comprises a powered conveyor assembly inclining upwardly and outwardly of the liquid body from a lower end below and in position to receive the delivery from the drum output end to an upper discharge end remote from the liquid body.

6. A diffusing apparatus, comprising an open-top tank adapted to confine a liquid body, a power-rotatable shaft axially horizontal above and longitudinally of said tank, an open-ended, tubular drum belt-suspended from, in axial parallelism with, and for rotation about its axis by said shaft within and below the normal liquid body level of said tank, means interiorly of said drum operable as an incident of drum rotation to translate material in a state of agitation therethrough, means including a partition transversely dividing the liquid body exteriorly of the drum for generating a liquid current flow through said drum in opposition to the path of material travel therein, means for continuously delivering material to the infeed end of said drum, means for continuously removing material from the tank at the output end of said drum, and means for selectively withdrawing liquid from the material infeed end of the tank.

7. A diffusing apparatus, comprising an open-top tank adapted to confine a liquid body, a power-rotatable shaft axially horizontal above and longitudinally of said tank, an open-ended, tubular drum belt-suspended from, in axial parallelism with, and for rotation about its axis by said shaft within and below the normal liquid body level of said tank, continuously-spiral rib flights on and projecting inwardly from the drum inner cylindrical wall for translation of material in a state of agitation through said drum as an incident of drum rotation, means including a partition transversely dividing the liquid body exteriorly of the drum for generating a liquid current flow through said drum in opposition to the path of material travel therein, means for continuously delivering material to the infeed end of said drum, means for continuously removing material from the tank at the output end of the drum, and means for selectively withdrawing liquid from the material infeed end of the tank.

8. A diffusing apparatus, comprising an open-top tank adapted to confine a liquid body, a power-rotatable shaft axially horizontal above and longitudinally of said tank, an open-ended, tubular drum belt-suspended from, in axial parallelism with, and for rotation about its axis by said shaft within and below the normal liquid body level of said tank, continuously-spiral rib flights on and projecting inwardly from the drum inner cylindrical wall for translation of material in a state of agitation through said drum as an incident of drum rotation, a pump-served by-pass effective to deliver liquid from adjacent the drum infeed end to and axially of the drum output end in opposition to the direction of material translation, a partition transversely dividing said tank in rotation-accommodating cooperation with a drum midportion to inhibit level-adjusting liquid body displacement save through said drum, means for continuously delivering material to the infeed end of the drum, means for continuously removing material from the tank at the output end of the drum, and means for selectively withdrawing liquid from the material infeed end of the tank.

9. The organization according to claim 8, wherein the means for delivering material to the infeed end of the drum comprises a material conveyor arranged to deliver to the tank end adjacent the drum infeed end, a saddle fixedly inclining from the tank to arcuate cooperation with and about the lower portion of the drum infeed end, and spiral scoop extensions of said drum-mounted rib flights cooperable with said saddle as an incident of drum rotation to transfer material from said saddle and to the drum interior.

10. The organization according to claim 8, wherein the means for removing material from the tank at the output end of the drum comprises a powered conveyor assembly inclining upwardly and outwardly of the tank from a lower end below and in position to receive the delivery from the drum output end to an upper discharge end remote from the tank, an apron conformably inclining with and underlying said conveyor for the return of conveyor losses to the tank, and pressure-served, liquid spray arms overhanging the conveyor assembly portion above the tank liquid level for direction of their discharge with washing effect against and upon the material charge of the conveyor.

11. A tank adapted to confine a liquid body, a rotatable drum in the tank, means within the drum to translate liquid and material from one end to the other end thereof as a consequence of drum rotation, means peripherally of the drum cooperating with a partition transversely of the tank to form a substantially watertight diaphragm between the ends of the drum, means for supplying liquid to the tank at one end of the drum and for removing charged liquid from the tank at the other end of the drum, means for circulating the liquid in the tank through the drum in a direction opposite to the flow generated by drum rotation, and means for feeding material to be treated into one end of the drum and for removing treated material from the tank at the other end of the drum.

JOSEPH P. RUTH.

REFERENCES CITED

The following references are of record in the file of this patent:

UNITED STATES PATENTS

| Number | Name | Date |
|---|---|---|
| 243,722 | Perret | July 5, 1881 |
| 1,189,502 | Stewart | July 4, 1916 |
| 1,487,541 | Coogan | Mar. 18, 1924 |
| 2,466,259 | Morton | Apr. 5, 1949 |

FOREIGN PATENTS

| Number | Country | Date |
|---|---|---|
| 429,601 | France | July 22, 1911 |